United States Patent Office 3,625,737
Patented Dec. 7, 1971

3,625,737
PROTECTIVE COATING AND METHOD
OF MAKING
Edmund N. Ricchezza, deceased, late of Henderson, N.C.,
by Barbara C. Ricchezza, executrix, Henderson, N.C.,
and Robert H. Doremus, Schenectady, N.Y., assignors
to General Electric Company
No Drawing. Filed Nov. 21, 1969, Ser. No. 878,888
Int. Cl. B44d 1/44
U.S. Cl. 117—62          10 Claims

ABSTRACT OF THE DISCLOSURE

Protective silicate coating on aluminum reflector with aluminum oxide film on its surface is treated with ammonium fluoride solution and thereafter with nitric acid to remove substantially all the alkali metal ions in the silicate coating to avoid formation of haze in the coating when exposed to the atmosphere.

---

A method of providing a silicate protective coating on metal reflector surfaces such as aluminum is disclosed in co-pending application of Curry, Ser. No. 698,414, filed Jan. 17, 1968 and assigned to the same assignee as the present invention. As there disclosed, the formation of an undesirable haze in the transparent silicate coating is prevented by treating the coating with a solution for removing substantially all of the alkali metal ions therefrom. It has been found, however, that such removal of the alkali metal ions is incomplete when the silicate coating is applied on a reflective surface having an aluminum oxide film thereon, as compared to a similar reflective surface which does not have such an oxide film.

It is an object of the present invention to provide an aluminum oxide coated surface having a transparent silicate protective film thereon which avoids the formation of haze therein, and a method of making the same.

It is a particular object of the invention to provide a method of facilitating the removal of alkali metal ions from a silicate coating applied on aluminum oxide coated metal reflective surfaces, such as aluminum.

Another object of the invention is to provide on reflective surfaces a transparent protective composite coating which is hard, tightly adherent, corrosion and abrasion resistant, and readily cleaned.

Other objects and advantages will become apparent from the following description and the appended claims.

With the above objects in view, the present invention relates in one of its aspects to a method of providing a protective coating on an aluminum reflective surface having an aluminum oxide film thereon which comprises providing a transparent coating of an alkali metal silicate compound on the aluminum oxide coated reflective surface, treating the coating with a fluoride compound, and then treating the thus treated coating with a liquid solvent for the alkali metal ions in the silicate coating for removal of the latter ions therefrom.

In a typical application of the invention, an aluminum reflector for a lighting fixture may be provided with a highly specular reflecting surface having an aluminum oxide film thereon on which a non-hazing transparent protective silicate coating is applied in accordance with the invention, as more fully described herein. In a particularly preferred procedure, the reflective surface of the aluminum article is initially mechanically buffed to remove scratches and other marks thereon. Such buffing may be done by using any suitable abrasive paste, such as jeweler's rouge, applied by a cloth-covered buffing wheel.

After the buffing step and a washing treatment to remove the abrasive material, the surface is subjected to a brightening treatment, preferably using a chemical brightening solution to provide thereon a highly specular reflecting surface. Such a chemical treatment is disclosed, for example, in the patent to Cohn 2,729,551, and the disclosure of such treatment in the patent is incorporated herein by reference. A particular chemical treatment found satisfactory for the purposes of the present invention comprises dipping the aluminum article in a hot solution, e.g., at 220° F., containing free-phosphoric acid and nitric acid. A particular solution of this type comprises, in percent by weight:

| | Percent |
|---|---|
| Phosphoric acid | 81 |
| Nitric acid | 3 |
| Water | 16 |

After the article is kept in the bath for about 4 minutes, it is removed and rinsed in warm water (maximum temperature 100° F.). The article is then dipped into a bath of 50% nitric acid solution for about 2 minutes for removing the dark deposit (smutting) which may be left by copper and other impurities in the phosphoric acid brightening bath, after which the reflective article is removed and rinsed in cold water.

The described brightening treatment removes any oxide film on the aluminum surface, and smooths out the surface, and as a result the aluminum article is provided with a highly specular reflective surface usually characterized by a total reflectance of as much as 90% or more, of which the diffuse component is 10% or less.

After the brightening treatment, the aluminum article is provided with an anodic oxide film such as by making it the anode in the sulfuric acid solution and applying about 14 volts D-C to the electrolyte. It will be understood however that the anodizing may be carried out in any known or conventional manner.

After the anodizing step, the anodized aluminum article is coated with a protective silicate film which is typically less than .1 mil thick. For this purpose, the aluminum member is dipped in a solution comprising an alkali metal silicate and water, and preferably also containing a wetting agent such as disclosed in the aforementioned Curry application. The metal silicate compound may, for example, be potassium silicate or sodium silicate. The water solution contains, in percent by weight, about 5–25% solids in the form of alkali metal oxide and silica, with a typical composition containing about 10% solids and 90% water. A particularly satisfactory commercially available potassium silicate solution used in preparing the silicate coating bath has the following approximate composition in percent by weight:

| | Percent |
|---|---|
| Potassium oxide, $K_2O$ | 8.3 |
| Silica, $SiO_2$ | 20.8 |
| Water | 70.9 |

To make the silicate coating bath, the following solution in percent by volume is provided, using the above commercial potassium silicate solution:

| | Percent |
|---|---|
| Potassium silicate solution | 35 |
| Water | 65 |
| Wetting agent | 0.1–0.3 |

The presence of the wetting agent enables the silicate coating solution to thoroughly wet the surface of the aluminum member so as to produce a continuous, tightly adherent, uniform silicate film thereon, and also to facilitate removal of the excess silicate solution from the article when the latter is removed from the bath. However, use of a wetting agent is not always necessary.

After the aluminum member is taken from the coating bath and following the removal of excess silicate solution therefrom, as by permitting it to drain while stationary or by spinning it, the thus coated member is dried, either in air at room temperature or in an oven at temperatures up to 200° F. Thereafter, the coated article is baked for about 5 minutes at about 572° F. to dehydrate and thereby harden the coating, which is about .06 mil thick. Then the baked coated article is removed from the baking oven and thereafter dipped for about 4 minutes in a hot water or acid solution, e.g., a 1.0% nitric acid solution at a temperature of about 140–160° F. after which the article is removed and any acid thereon rinsed off with water.

After this treatment, substantially all of the remaining alkali metal ions are removed from the transparent silicate coating, in accordance with the present invention, by the following illustrative process:

(1) Rinse the coating in a 5% aqueous solution of ammonium fluoride at room temperature for about 4 minutes.

(2) Rinse in cold water for about 1 minute to remove excess ammonium fluoride from the surface.

(3) Rinse in 1.0% nitric acid or hot water at about 160° F. for about 4 minutes.

(4) Rinse in cold water at about pH 6 to remove excess nitric acid from the surface.

In a usual procedure, the above series of steps is preferably repeated three times to ensure removal of enough alkali metal ions to prevent haze in the final silicate coating.

While ammonium fluoride has been found particularly satisfactory for the purposes of the invention, other fluoride compounds may alternatively be used, for example, hydrofluoric acid, ammonium bifluoride, and sodium fluoride. In general, the concentration of the fluoride compound used in the described process is ordinarily up to about 10% by weight. In the case of the fluoride salts, an optimum concentration range is about 4–8%, whereas HF is preferably used in concentrations of about 2% or less.

In carrying out the described process, an appropriate combination of the specific type, concentration and solution temperature of the fluoride compound, length of treatment therewith, and number of cycles of the above-described process steps should be used to ensure minimum attack on the transparent silicate film coupled with the maximum removal of the alkali metal ions therefrom.

It has been found that the use of an intermediate fluoride treatment in accordance with the invention facilitates removal, by the subsequent nitric acid treatment, of substantially all of the alkali metal ions from the silicate coating applied over an aluminum oxide film on the substrate. In comparative tests carried out in connection with the invention, two groups of similar aluminum reflectors with anodic oxide films thereon were used, one group being treated in accordance with the process of the invention including an intermediate treatment with ammonium fluoride, the other group being similarly treated except that the ammonium fluoride treatment was omitted. Both groups of reflectors were similarly exposed to severe environmental conditions including high humidity and nitric acid vapors. It was found that those reflectors treated with ammonium fluoride withstood over 200 hours of such exposure without evidence of haze in the silicate coating, whereas the reflectors not so treated exhibited severe hazing in the silicate coating after about 30 hours under those conditions.

In general it has been found that in treating silicate coatings applied over aluminum oxide films, shorter treatment times can be used for removing substantially all of the alkali metal ions where the intermediate fluoride step is employed.

While it is not fully known why the fluoride treatment provides such marked improvement, it appears probable that the aluminum ions present in the silicate coating as a result of applying silicate compounds on the aluminum oxide film have a blocking or barrier effect which hinders removal of the alkali metal ions by the nitric acid treatment, and that the fluoride forms a specific aluminum fluoride compound with the aluminum ions so as to reduce such a blocking effect.

The foregoing treatment removes substantially all the alkali metal ions from the silicate coating so as to avoid the formation of carbonates by reaction of such ions with the $CO_2$ in the air, which would cause a hazy film to form on the silicate coating. Such a carbonate film not only detracts from the appearance of the reflector but also significantly reduces the amount of light transmitted through the coating. The final coating appears to be composed of partially hydrated silicon dioxide.

The liquid used for the alkali metal ion extraction is one in which the alkali metal ions, viz, potassium, sodium and lithium, are soluble. In particular, inorganic acid solutions such as nitric acid and hydrochloric acid in a concentration range of about 0.1–5.0%, are suitable for this purpose, or distilled water at about 200° F. may be used. In general, the extraction of ions in accordance with the invention results in a final concentration of alkali metal ions in the silicate film ranging from trace amounts to a maximum of about .04% by weight. It will be evident, accordingly, that for the purposes of the invention the concentration of alkali metal ions in the extracting liquid must be at least below .04% by weight, and preferably substantially below that concentration. The preferred temperature for the extraction liquid is in the range of about 140–212° F., depending on the particular solvent used and the desired rate of extraction. It is desirable to ensure sufficient rinsing between the acid treatment and fluoride treatment steps, since any combination of the two, i.e., due to carryover of the fluoride into the acid or vice versa during the treatment process can lead to damage of the silicate film.

While the temperature at which the applied silicate coating is baked is given in the above-described typical process as about 572° F., in general a bake temperature above about 480° F. has been found suitable. The maximum bake temperature would be dependent mainly on the nature of the substrate on which the silicate coating is deposited. Thus, in the case of an aluminum reflector, it is preferred not to heat the coated aluminum above about 900° F. to avoid the risk of adversely affecting the properties of the aluminum.

While the process of the invention has been described with respect to reflective aluminum surfaces, other substrates including those of other metals or of non-metal type having an aluminum oxide film provided thereon in any desired manner may be similarly treated to provide a transparent protective silicate coating free of hazing tendencies.

It will be understood that the process as described above is given only by way of example and that the invention is not intended to be limited by the specific details thereof. For example, the treatment of aluminum to produce a specular reflective surface thereon prior to applying the silicate coating may be other than by the described chemical treatment, such as by a suitable mechanical smoothing and polishing process, or by a chemical treatment other than that described. Also, the application of the silicate coating solution may be by methods other than by dipping as described, such as by spraying, brushing, rolling, electrophoretic deposition, or by other suitable techniques.

The silicate coating produced in accordance with the invention is a hard, glassy tightly adherent transparent film which is highly resistant to attack by chemicals and other contaminating agents, is easy to clean, and does not markedly affect the highly reflecting characteristics of the substrate surface which it overlies. Moreover, the invention makes possible the provision of a composite protective coating of aluminum oxide and silicate film which affords greater protection for the underlying substrate than a single silicate or a single oxide coating. Such a composite coating also avoids producing interference colors therein such as have been observed in single coating layers.

The advantages of the reflectors produced by the process of the invention are particularly important in such applications as street lighting and industrial luminaires which are installed in areas of highly contaminating and corrosive atmospheres. The improved reflectors in such environments not only will retain a high level of light reflection properties for prolonged periods, but are readily cleaned to maintain their original light-producing effectiveness.

While the present invention has been described with reference to particular embodiments thereof, it will be understood that numerous modifications may be made by those skilled in the art without actually departing from the scope of the invention. Accordingly, we wish to have it understood that we intend herein to cover all such modifications as fall within the true spirit and scope of our invention.

What we claim as new and desire to secure by Letters Patent of the United States is:

1. A coating method comprising applying a transparent coating of an alkali metal silicate compound on a substrate having an aluminum oxide film thereon, treating said coating with a solution a fluoride compound, and treating the thus treated coating to remove substantially all of the alkali metal ions therefrom.

2. A method as defined in claim 1, said last mentioned treating step comprising contacting said silicate coating with a liquid solvent for said alkali metal ions.

3. A method as defined in claim 2, said fluoride compound being in a water solution.

4. A method as defined in claim 1, said fluoride compound being a water soluble fluoride salt.

5. A method as defined in claim 4, said fluoride compound being ammonium fluoride.

6. A method as defined in claim 1, wherein said transparent silicate coating is treated with a liquid solvent for alkali metal ions prior to said fluoride compound treating step.

7. A method as defined in claim 1, wherein said substrate is an aluminum reflector having a specular reflective surface thereon.

8. A method as defined in claim 2, said liquid solvent comprising an inorganic acid solution.

9. A method as defined in claim 1, and repeating said first and second mentioned treating steps to remove sufficient alkali metal ions to prevent haze in the final silicate coating.

10. A method as defined in claim 1, said fluoride compound being in solution in a concentration of up to about 10% by weight.

References Cited
UNITED STATES PATENTS

| | | | |
|---|---|---|---|
| 3,499,780 | 3/1970 | Etherington et al. | 117—135.1 |
| 3,485,687 | 12/1969 | Chapman | 117—62 |
| 2,978,361 | 4/1961 | Seidl | 117—135.1 |
| 2,989,418 | 9/1961 | Harbaugh | 117—135.1 |
| 2,952,562 | 9/1960 | Morris et al. | 117—62 |
| 3,025,764 | 3/1962 | McKenzie | 117—35 A |
| 3,423,229 | 1/1969 | Kompanek et al. | 117—135.1 |

WILLIAM D. MARTIN, Primary Examiner

M. SOFOCLEOUS, Assistant Examiner

U.S. Cl. X.R.

117—35 R, 135.1, 70 S, 169 R; 148—6.27